United States Patent [19]

Ishida et al.

[11] 3,880,352
[45] Apr. 29, 1975

[54] METHOD AND DEVICE OF SAMPLING CONTROL

[75] Inventors: Koichi Ishida; Kozo Yoneda, both of Kawasaki, Japan

[73] Assignee: Fuji Electric Co., Ltd., Kanagawa, Japan

[22] Filed: Apr. 24, 1974

[21] Appl. No.: 463,719

[30] Foreign Application Priority Data
Apr. 25, 1973 Japan.............................. 48-47436

[52] U.S. Cl. ............. 235/150.1; 318/636; 328/151; 328/161
[51] Int. Cl. .......................................... G05b 21/02
[58] Field of Search................. 235/150.1, 161, 151

[56] References Cited
UNITED STATES PATENTS
3,456,190  7/1969  Renner ........................... 328/161 X Primary Examiner—Eugene G. Botz
Attorney, Agent, or Firm—Sughrue, Rothwell, Mion, Zinn & Macpeak

[57] ABSTRACT

A method and device for sampling control of a feedback control system wherein the controlled variable can be expressed by a product or a quotient of the manipulated variable and a system disturbance is disclosed. The principle of operation is, in the case where the controlled variable can be expressed as a product, to provide a signal corresponding to a quotient between the actual value of the controlled variable at a certain instant and a desired value, and to multiply said signal by a manipulated variable signal obtained in the previous sampling period, and to send the product signal thus obtained to a controlled system as a new manipulated variable signal in the succeeding sampling period.

8 Claims, 12 Drawing Figures

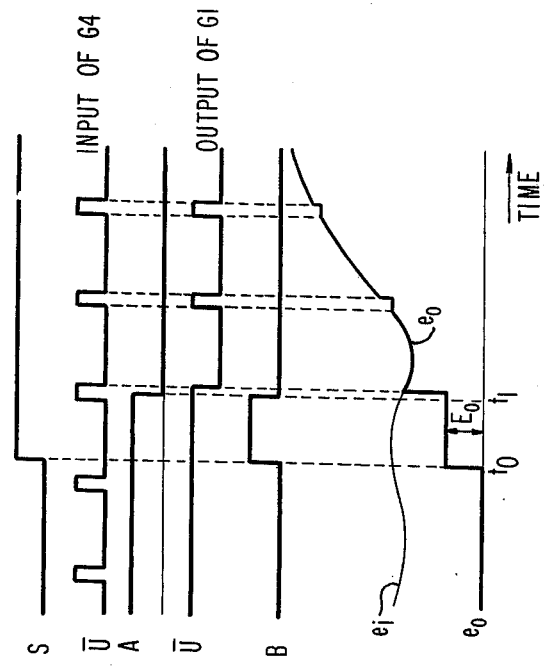
FIG.7
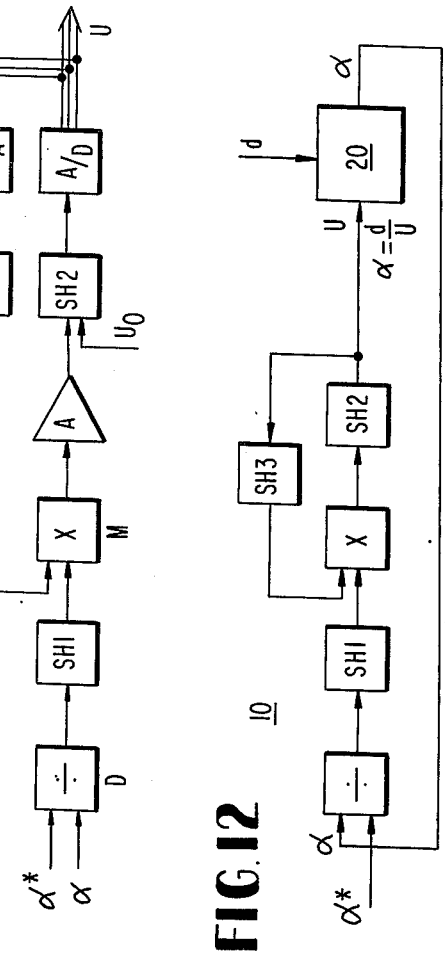
FIG.11
FIG.12
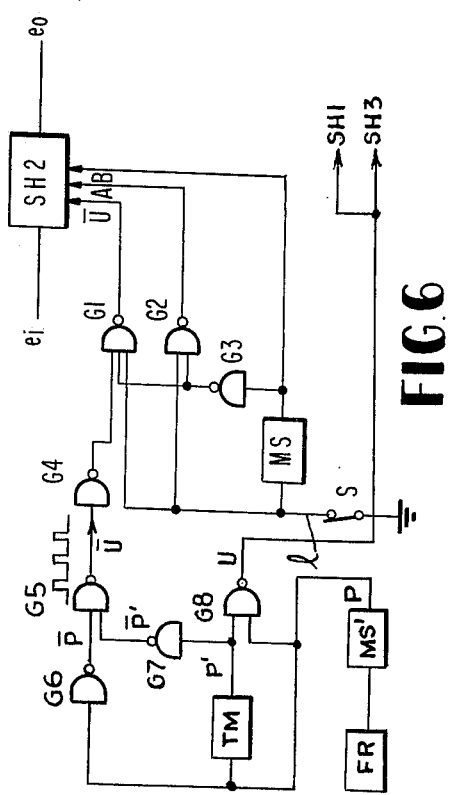
FIG.5
FIG.6

METHOD AND DEVICE OF SAMPLING CONTROL

BACKGROUND OF THE INVENTION

The present invention relates to a sampling control method and device for automatically equalizing the controlled variable of a controlled system and a commanding variable, and the object thereof is to provide a sampling control method which can be effectively applicable to a controlled system in the cases where a controlled variable can be expressed by a product or quotient between the manipulated variable and a disturbance, and also to provide a control device of preferably an analog type for practicing the above-mentioned control method in a relatively simple and inexpensive manner. The fundamental principle of the present invention is to provide a signal corresponding to a quotient between the actual value of the controlled variable at a certain instant and a desired value, and to multiply said signal by a manipulated variable signal obtained in the previous sampling period, and to send the product signal thus obtained to a controlled system as a new manipulated variable signal in the succeeding sampling period, whereby the actual value of the controlled variable in the controlled system is automatically equalized to the desired value of the controlled variable. In a prior art controlled system wherein the controlled variable is expressed in the form of a product or quotient of the manipulated variable and the disturbance, the gain of the controlled system fluctuates with the change of the disturbance so that it is difficult to obtain a quick response to the disturbance over a wide range. In contrast, according to the control method of the present invention, it is possible to ensure a quick response over a wide range of the disturbance.

BRIEF DESCRIPTION OF THE DRAWINGS

The specific nature of the invention, as well as other objects, aspects, uses and advantages thereof, will clearly appear from the following description and from the accompanying drawings, in which:

FIG. 5 is a table specifying the operation of the sample and hold element shown in FIG. 4;

FIG. 6 is a logic diagram showing an example of a control circuit for a sample and hold element included in the control system of this invention;

FIG. 7 is a timing diagram showing the operation of one of the sample and hold elements included in the control system according to this invention;

FIGS. 10, 11 and 12 are circuit diagrams showing alternative embodiments of the present invention.

DESCRIPTION OF THE PREFERRED EMBODIMENTS

Figure 1:
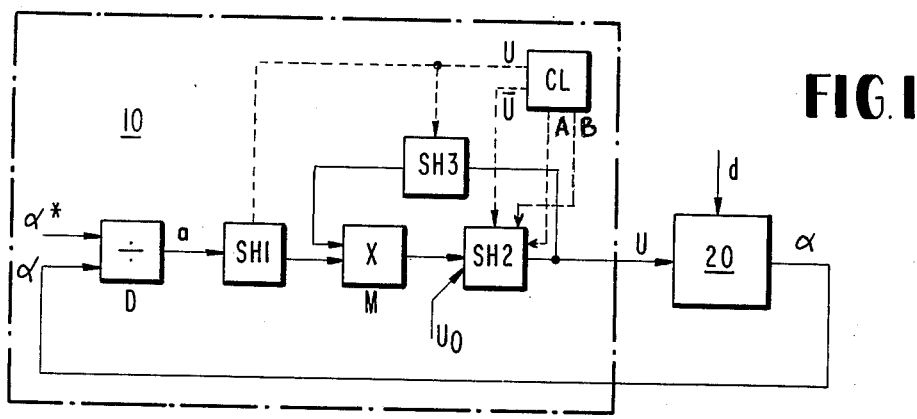
FIG. 1 is a block diagram showing an example of the control system according to the present invention.

FIG. 1 shows schematically an example of a controlled system to which the control device and method according to the present invention may be applied. A manipulated variable $u$ is applied onto a controlled system 20 by a control device 10. The actual value ($\alpha$) of the controlled variable of the controlled system 20 is fed back to the input of the control device 10. The final controlled element and the means for detecting the actual value $\alpha$ are not shown for simplification of the explanation; furthermore, the means for setting a desired value $\alpha^*$ of the controlled variable is also not shown. However, such means for detecting and means for setting are well known in the feedback control art.

A divider D is provided at the input side of the control device 10, and to this divider are introduced a desired value $\alpha^*$ of the controlled variable as, for example, a dividend input and an actual valve $\alpha$ of the controlled variable as a divisor input. Further, the control device 10 comprises three sample and hold elements, SH1, SH2 and SH3 which are typically analog reset integrators, a mode control circuit CL for mode controlling them correctly, and a multiplier M. The input terminal of the sample and hold element SH1 is connected to the output terminal of the divider D, and the output terminal of SH1 is connected to one of the input terminals of the multiplier M. To another input terminal of the multiplier M is connected the output terminal of the sample and hold element SH3. The output terminal of the multiplier M is connected to the input terminal of the sample and hold element SH2. Further, the output terminal of this sample and hold element SH2 is connected to the input terminal of the sample and hold element SH3. The manipulated variable $u$ for the controlled system 20 is obtained from the sample and hold element SH2.

Figure 2:
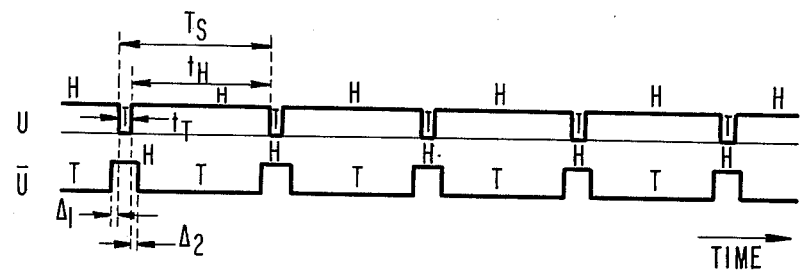
FIGS. 2 and 3 are timing diagrams showing an example of the mode signals generated in the mode control circuit included in the control system of this invention.

The sample and hold elements SH1 and SH3 are controlled by a mode control signal U from the mode control circuit CL, and the sample and hold element SH2 is controlled by another mode control signal $\overline{U}$. Both the mode control signals U and $\overline{U}$ include two different mode periods of a holding mode H and a track mode T in a predetermined period Ts as shown in FIG. 2. That is, the mode control signal U gives a holding mode H of a duration time period $t_H$ and a track mode T of a duration time period $t_T$, and these are selected such that $t_T << t_H$ and $t_T + t_H = $ Ts. The mode control signal $\overline{U}$ is basically an inverted logic of the mode control signal U, but the mode control signal U is transferred to the holding mode H a small time interval $\Delta 1$ prior to the instant when the mode control signal U is transferred to the track mode T. The mode control signal $\overline{U}$ is adapted to be held in the holding mode for a slight time $\Delta_2$ even after the mode control signal U has terminated the track mode, and both $\Delta_1$ and $\Delta_2$ are selected to be quite small as compared with the time period $t_T$.

Figure 3:
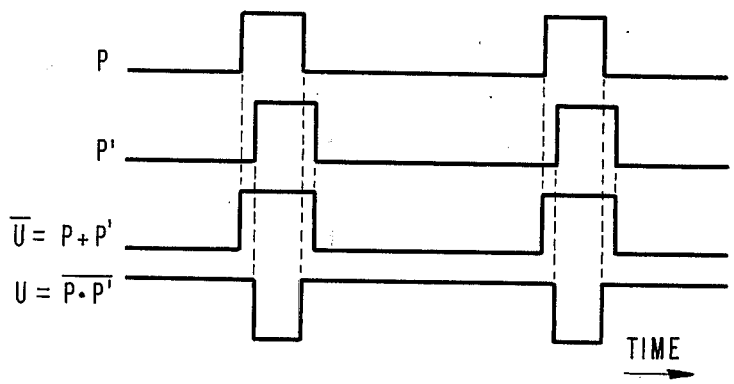

The mode control circuit CL generates the mode control signals in the form of a pulse train P and another pulse train P', which is obtained by retarding the pulse train P as shown, for example, in FIG. 3. Namely, the mode control signal $\overline{U}$ can be formed by a logic sum (OR) P + P' of both of the pulse train signals, and the mode control signal U is obtained by an inversion $\overline{P \cdot P'}$ of a logical product (AND) of P · P'.

The three sample and hold elements are controlled to operate in two kinds of modes — track mode and holding mode — by the mode control signals U and $\overline{U}$, but may also be controlled to operate in a reset mode at the starting time of the device and in an initial condition injecting mode at a required time. The initial condition injection mode is effected only in the sample and hold element SH2 in FIG. 1, and this initial condition is shown by $u_o$.

Figure 4:
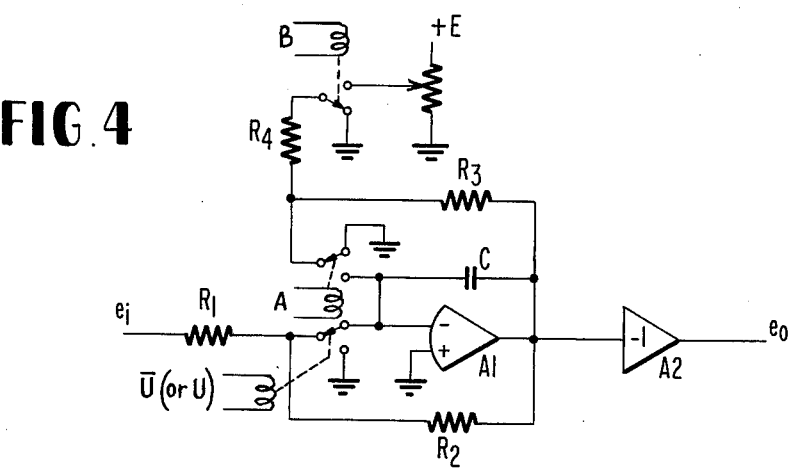
FIG. 4 is a circuit diagram showing the construction of a sample and hold element constituting one part of the control system of this invention.

An example of the construction of a sample and hold element is shown in FIG. 4. In this construction, an operational amplifier A1 having a non-inverting input terminal connected to the reference potential or ground and an inverting input terminal is included, and a holding condenser C is connected between the amplifiers inverting input terminal and output terminal. An amplifier A2 (a so-called inverting amplifier) having $-1$ gain is arranged at a subsequent stage of the operational amplifier A1, and an output voltage $e_o$ is taken from this inverting amplifier A2. This input voltage $e_i$ can be introduced to the inverting input terminal of the operational amplifier A1 through an input resistor R1, and the output terminal of the operational amplifier A1 can be connected to the non-inverting input terminal through a negative feedback resistor R2. The two terminals of the holding condenser C are adapted to be bridged through a reset resistor R3 by means of a relay controlled by a control signal A as will be described later. Furthermore (particularly for the sample holding element SH2) a resistor R4, a potentiometer P and a relay controlled by a control signal B, which will be described later, are added for injection of the initial condition. All of the resistors R1, R2, R3 and R4 are selected to have the same value. The contact points $\bar{U}$ (or U) of the relays A and B may also be provided respectively by a semiconductor switching element, such as field effect transistors.

According to the switching condition of these relay contacts, the sample and hold element is operated in four kinds of operational modes as shown in FIG. 5. In the table shown in FIG. 5, "0" represents the case in which each of the relay contacts are in a switching condition shown in FIG. 4, and when they are placed under the reverse switching condition, they are represented by "1". Furthermore, the initial condition injecting means or the operational modes thereof in FIGS. 4 and 5 are necessary only for the sample and hold element SH2, whereas as for the sample and hold elements SH1 and SH3, they are not necessary, and can thus be omitted.

FIG. 6 shows an example of one embodiment of an operational mode control circuit for the sample and hold element SH2 (refer to FIGS. 4 and 5), and FIG. 7 shows pulse diagrams illustrating the operation. In FIG. 6, G1, G2, G3 and G4 designate NAND gates, MS is a monostable multivibrator, and S is a starting switch. Since the monostable multivibrator MS is in an inoperative state before an instant $t_o$ at which the starting switch S is switched from the closed state to the open state, the output signal B is in 0 state. Since 0 signal is applied to one of the input terminals of NAND gates G1 and G2 at the closed state of the switch S, both the output signal $\bar{U}$ of the NAND gate G1 and the output signal A of the NAND gate G2 are in the state of 1. The sample holding element SH2 is then in the reset mode depending on the states of these control signals $\bar{U}$, A and B (refer to FIG. 5). Next, when a start instruction is given at the instant $t_o$, the switch S is opened and thereby the monostable multivibrator MS enters an operational condition. Accordingly, 0 signals are introduced respectively to the input terminals of NAND gates G1 and G2 which are connected to the output terminal of NAND gate G3. Therefore, NAND gates G1 and G2 keep producing output signals of 1 state regardless of the fact that a 1 signal is introduced to their input terminals which are connected to the switch S. Also, the control signal B is put under 1 state as a result of the operational condition of the monostable multivibrator. Thus, the sample holding element SH2 transfers to the initial condition injecting mode (FIG. 5).

The monostable multivibrator MS is brought into an inoperative state at an instant $t_2$ when a predetermined time $T_{MS}$ has passed from the time period $t_o$, and after this time, the output control signal B is maintained in the 0 state. Furthermore, the control signal A passing through the NAND gate G2 is held to 0 after the instant $t_1$. On the other hand, the control signal $\bar{U}$ introduced through another NAND gate G4 appears at the output of NAND gate G1 after this instant $t_1$. Accordingly, the sample and hold element SH2 is shifted to the sample mode when the control signal $\bar{U}$ becomes 0 thereby tracking the input $e_i$ of the sample-hold element, and is shifted to that of the holding mode when the control signal $\bar{U}$ becomes 1 thereby holding the value of the input $e_i$ for that period. Furthermore, FIG. 6 also shows an example of the circuit which forms the control signal $\bar{U}$ to be introduced to the input terminal of the NAND gate G4 and the control signal U for other sample and hold elements $SH_1$, $SH_3$. The output signal of the free running multivibrator FR is introduced to the monostable multivibrator MS', and the output signal P of the wave form as shown in FIG. 3 is taken out therefrom. This output signal P is introduced to the input terminal of the delay operation and return type timer element TM (so-called ON-delay and OFF-delay timer), and from the output terminal of the timer element the output signal P' of the wave form as shown in FIG. 3 is taken out. The output signal P of the monostable multivibrator MS' is introduced to one of input terminals of NAND gate G5 through NAND gate G6. Also, the output signal P' of delay operation and return type timer element TM is introduced to the other input terminal of the NAND gate G5 through NAND gate G7. Therefore, the output signal $\bar{U}$ ($= \overline{P \cdot P'}$) of the wave form shown in FIG. 3 is taken out from the output terminal of NAND gate G5, and resulting output signal $\bar{U}$ is introduced to the input terminal of NAND gate G4 as stated above. In addition, the output signal P of the monostable multivibrator MS' and the output signal P' of the timer element TM are directly introduced to the respective input terminals of the NAND gate G8. Accordingly, the output signal U ($= \overline{P \cdot P'}$) of the wave form as shown in FIG. 3 is taken out from the output terminal of the NAND gate G8, and the resulting signal U is used for controlling of the sample and holed elements $SH_1$, $SH_3$.

Referring back to FIG. 1, the operation of the control device according to the prssent invention will be described in detail. The quotient output of the divider D, $a = \alpha^*/\alpha$, is sampled by the sample-hold element SH1 at every time intervals Ts. Such quotient outputs at the sampling instants $t_1, t_2, \ldots, t_{n-1}$, and $t_n$ are expressed as $a_1, a_2, \ldots, a_{n-1}$, and $a_n$. The manipulated variable applied to the controlled system for the purpose of directing the controlled variable toward the desired value is designated by $u$, and the value of the manipulated variable $u$ for a period $(t_n, t_{n+1})$ is assumed to be $u_n$. The multiplier M multiplies a value $u_{n-1}$ of the manipulated variable u corresponding to the period $(t_{n-1}, t_n)$ which is the preceding period to the present period by the output $a_n$ of the divider D. The output $a_n \times u_{n-1}$ of the multiplier M is sampled in the sample and hold element SH2, and is introduced to the controlled system as a manipulated variable $u_n$ ($=a_n \times u_{n-1}$). In this case, the value of the manipulated variable $u$ in the preceding period ($t_{n-1}$, $t_n$) is stored in the sample and hold element SH3.

Figure 8:
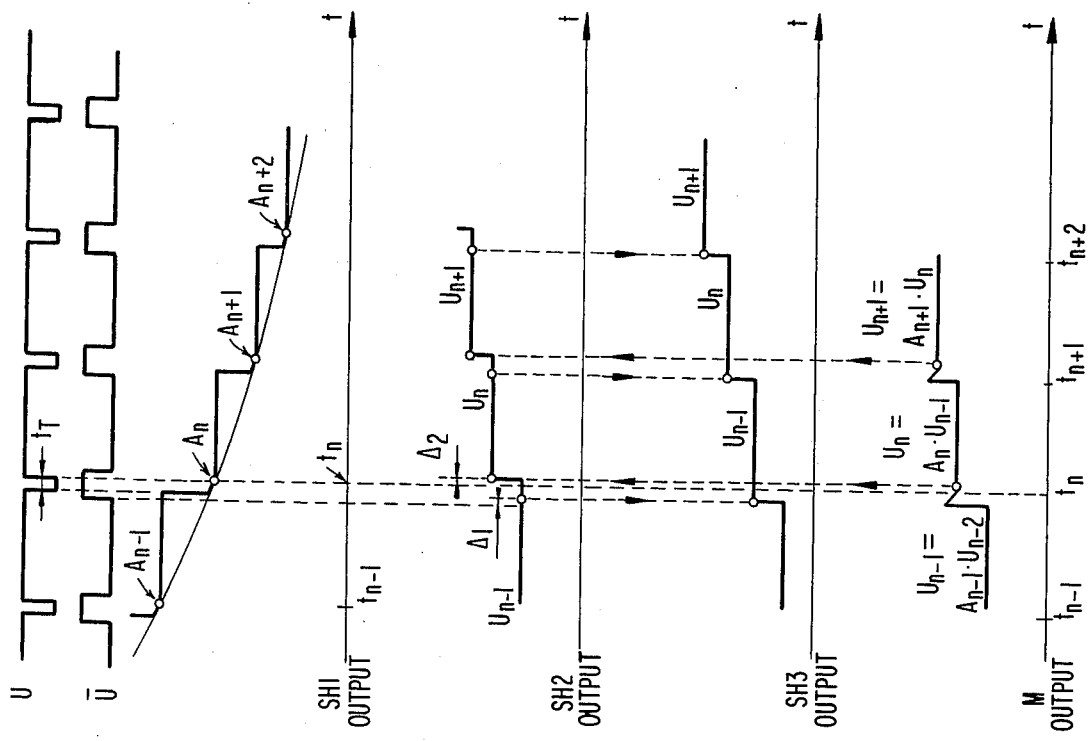

The operation of an accumulating circuit comprising the three sample and hold elements SH1, SH2, and SH3, and also the multiplier M will be made apparent with reference to FIG. 8. For a period from the instant ($t_{n-1} + \Delta 2$) to the instant ($t_n - t_T - \Delta 1$), the sample-hold element SH2 is in the tracking mode to track the output of the multiplier M, and a manipulating variable $u_{n-1} = a_{n-1} u_{n-2}$ is applied to the controlled system. The sample-hold element SH2 is then shifted into the holding mode for a period between the instant ($t_n - t_T - \Delta 1$) to the instant ($t_n + \Delta 2$), and continuously holds the value of $u_{n-1}$ as the output thereof. From the instant ($t_n - t_T$) to the instant $t_n$ within this period, the sample and hold elements SH1 and SH3 are kept in the tracking mode. Accordingly, the sample and hold element SH1 tracks the output $a$ of the divider D, and the sample and hold element SH3 tracks the output $u_{n-1}$ of the sample and hold element SH2. In accordance with the above described operations, the output of the multiplier M is also varied. The operations in the tracking mode of the two sample and hold elements SH1 and SH3 terminate at an instant $t_n$, and after this instant, the sample and hold element SH1 holds a value $a_n$ of the output $a$ at the instant $t_n$, and the sample and hold element SH3 holds a value $u_{n-1}$ of the output of the sample and hold element SH2. Thus, the output of the multiplier M is held to a value $a_n \cdot u_{n-1}$. When a slight time $\Delta 1$ has passed after the time instant $t_n$, the sample and hold element SH2 is again shifted to the tracking mode thereby tracking the output value $a_n \cdot u_{n-1}$ of the multiplier M at that time and sending this value to the controlled system as its new manipulated variable $u_n$. The above described operations are repeated for a required number of times.

When it is assumed that an initial value of the sample and hold element SH2 is $u_o$, the output of the sample-hold element SH2 is varied as $u_o \rightarrow a_1 u_o \rightarrow a_2 a_1 u_o \rightarrow a_3 a_2 a_1 u_o \rightarrow \ldots$ In the case $a_1 = a_2 = a_3 = \ldots = a_n = a$ (which is not constant), $u_n = a^n u_o$ is obtained. Accordingly, if $a > 1$ the manipulated variable will increase exponentially, if $a < 1$ the manipulated variable will be reduced exponentially, and when $a = 1$, the manipulated variable $u$ is maintained to the initial value $u_o$. The fundamental construction and operation of the control device according to the present invention have now been made apparent, and hence a characteristic of the control device constructed into a closed loop controlling system will next be described together with the controlled system.

In FIG. 1, the controlled system 20 is assumed to be of a kind wherein the controlled variable $\alpha$ is increased when the manipulated variable is increased. Since $u_n = a_n u_{n-1}$, the manipulated variable $u$ is increased periodically when $a_n > 1$, and when $a_n < 1$, the manipulated variable $u$ is decreased periodically. In either of the cases, the output $a$ of the divider is brought to be closer to 1, whereby the actual value $\alpha$ of the controlled variable is regulated toward the desired value $\alpha^*$. In the case where the controlled variable $\alpha$ in the controlled system is in a relation equal to the product of the manipulated value $u$ and the disturbance $d$, that is $\alpha = u \times d$, the control device operates as follows for the variation of $d$ with the time delay of the variation of the controlled variable $\alpha$ caused by the variations of the manipulated variable $u$ and the disturbance $d$ being neglected. Assuming that $d = d_o$, $u = u_o$, $\alpha = \alpha_o = d_o u_o = \alpha^*$ before the time instant $t = t_{n-1}$, an actual value $\alpha$ of the controlled variable is varied from $\alpha^* = d_o u_o$ to $d_1 u_o$ when the disturbance $d$ is abruptly increased (or decreased) from $d_o$ to $d_1$ during the time interval ($t_{n-1}, t_n$). Thus the manipulated variable $u_n$ in the time period ($t_n, t_{n+1}$) is reduced (or increased) to $$u_n = a_n \cdot u_{n-1} = \frac{\alpha^*}{d_1 u_o} \cdot u_o = \frac{d_o u_o}{d_1 u_o} \cdot u_o = \frac{d_o}{d_1} \cdot u_o$$

and, as a result, the controlled variable $\alpha$ is finally brought into $$\alpha = d_1 \cdot u_n = d_o u_o = \alpha^*$$

that is, $$a = \alpha^*/\alpha = 1$$

In the case of changing the setting of the control system, that is, when the desired value $\alpha^*$ of the controlled variable which was $\alpha^* = \alpha_o$ ($u = u_o$, $d = d_o$, and $\alpha = d_o \cdot u_o = \alpha^*_o$) before the time instant $t = t_{n-1}$ is changed to $\alpha^*_1$ during the time interval ($t_{n-1}, t_n$), then the manipulated variable $u_n$ in the time period ($t_n, t_{n+1}$) is changed to $$u_n = \frac{\alpha^*_1}{d_o \cdot u_o} \cdot u_o = \frac{\alpha^*_1}{d_o}$$

As a result, the actual value of the controlled variable settles to $\alpha = d_o \cdot u_n = d_o \cdot \alpha^*_1/d_o = \alpha^*_1$ Thus, it is apparent that, for the relation $\alpha = d \times u$ and neglecting the time delay in the variation of the controlled variable $\alpha$ for an abrupt variation of the manipulated variable $u$ or the disturbance $d$, the controlled variable $\alpha$ is settled within one sampling pulse after the abrupt variation of the desired value $\alpha^*$ or the disturbance $d$.

The transient response of the control system of the invention in the case of the time delay of the controlled variable $\alpha$ caused by an abrupt variation of the manipulated variable $u$ or the disturbance $d$ cannot, however, be neglected. Although the control operations are achieved along with the operational steps as described above, several sampling pulses are required for settling the control operation of the control system.

Figure 9:
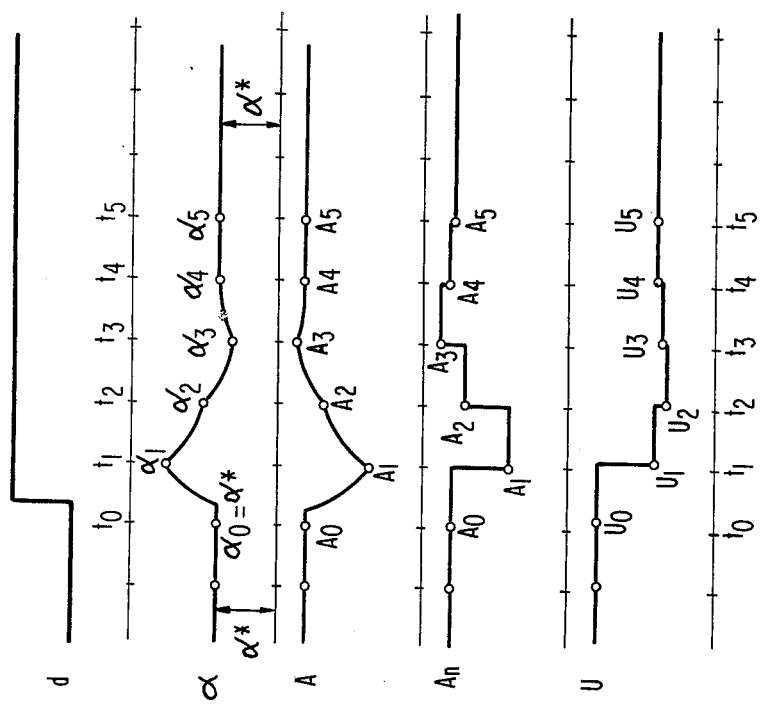
FIGS. 8 and 9 are timing diagrams showing the operation of the control system of this invention.

As an example of a typical case, variation with time of the controlled variable $\alpha$ when the disturbance $d$ is abruptly varied during a time period between the instants $t_o$ and $t_1$, variation with time of the output $a$ of the divider D, variation with time of the output $a_n$ of the sample and hold element SH1, and the variation with time of the manipulated variable u, all under the same condition, are shown in FIG. 9. As will be apparent from FIG. 9, the variation of the controlled variable exhibits some delay against the variations of the manipulated variable and disturbance, the initial part of the transient characteristic becomes somewhat oscillatory. However, the transient state is settled within one or two pulses when the length of the sampling pulses is suitably elongated in correspondence with the time delay.

Although it has been described for purposes of simplification that the output of the sample and hold element SH2 is directly connected to the input of the controlled system for supplying a manipulated variable, an amplifying element or a final control element may be provided between the sample and hold element SH2 and the controlled system 20, and the input of the sample and hold element SH3 may be connected either to the input or output of the amplifying element. In a control system of such a construction, the object of the present invention can also be achieved. In a particular case where the element has a nonlinear characteristic between the input and output thereof, the output of the nonlinear element is connected to the input of the sample and hold element SH3 so that the variation of the gain of the control system due to the existence of the nonlinear element in the system can be compensated without requiring further insertion of a compensating element in the loop of the control system.

The divider D and the multiplier M indicated in FIG. 1 may be an analog divider and an analog multiplier available in the market. The analog divider available in the market can deliver an output voltage $Z = 10\ X/Y$ (V) wherein X (V) represents a dividend and Y (V) represents a divisor. Furthermore, the analog multiplier available in the market can deliver an output voltage of $Z = 1/10\ XY$ (V) when the two inputs to be multiplied are X (V) and Y (V).

Figure 10:
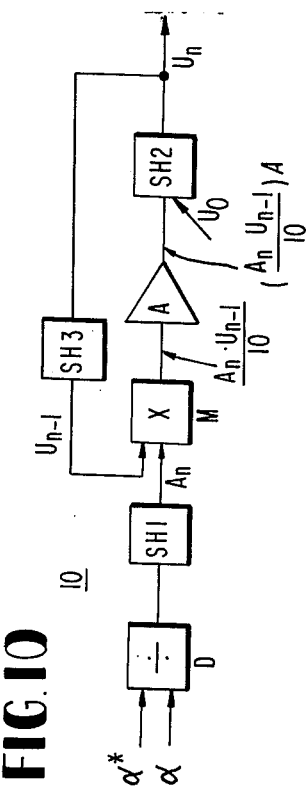

When the ratio of $\alpha^*/\alpha$ is regulated toward 1, the voltage corresponding to the above-mentioned 1 can be selected to any desired voltage by inserting an amplifier of a suitable gain A as shown in FIG. 10 between the multiplier M and the sample and hold element SH2. In this case, the relation between the input and output of the sample hold element SH2 can be expressed from the above description as $$u_n = \frac{a_n A}{10} u_{n-1}$$

since $u_n$ should be equal to $u_{n-1}$ when the control system is in a settled condition, a relation of $$\frac{a_n A}{10} = 1,\ \text{or}\ a_n = \frac{10}{A}\ (V)$$

is obtained. Thus, by selecting the value of the gain A to be a suitable value, the voltage corresponding to $a_n = 1$ can be adjusted to any desired value.

In this case, since there is a relation of $$10\ \frac{\alpha^*}{\alpha} = a_n = \frac{10}{A},\ \text{or}\ \alpha = \frac{A}{10}\alpha^*$$

the maximum value of $\alpha$ can be expressed utilizing the maximum value of $\alpha^*$ as follows.

$$\alpha_{max} = \frac{A}{10}\alpha^*_{max}$$

In the case where a digital value is required as the output of the control system 10, an analog-digital converter A/D is inserted at the subsequent stage of the sample hold element SH2 as shown in FIG. 11. In such an arrangement, it is further desired that the input of the sample and hold element SH3 is connected through a digital-analog converter D/A to the output terminal of the analog-digital converter A/D.

A slight modification required for this case is that the dividend input and the divisor input for the divider D are reversed as shown in FIG. 12 in comparison with the circuit shown in FIG. 1 because the controlled variable $\alpha = d/u$. The construction of the circuit in this example is quite the same as that of the previous example. Since the only difference in this case is that the controlled variable is in a relation of $\alpha = u/d$ while it was expressed in the previous example as $\alpha = u \times d$, a control system similar to that shown in FIG. 1 may be used, and the operation of the control system for this case will be easily understood from the above description. In this example, the control is achieved against a variation of the disturbance as follows.

Assuming that the variables of the system were $d = d_o$, $u = u_o$, and $\alpha = \alpha_0 = d_o/u_o = \alpha^*$ before the time instant $t = t_{n-1}$ and the disturbance $d$ was abruptly changed from $d_o$ to $d_1$ in a time interval $(t_{n-1}, t_n)$, then the controlled variable $\alpha$ is changed from a value $\alpha^* = d_o/u_o$ to a value $d_1/u_o$, and hence the manipulated variable $u_n$ in the time interval $(t_n, t_{n+1})$ is varied as $$u_n = \frac{\alpha}{\alpha^*}\ u_{n-1} = \frac{d_1/u_o}{d_o/u_o}\ u_o = \frac{d_1}{d_o}\ u_o$$

As a result, the controlled variable $\alpha$ is settled to be $$\alpha = \frac{d}{u} = \frac{d_1}{\frac{d_1}{d_o}\cdot u_o} = \frac{d_o}{u_o} = \alpha^*$$

that is, $\alpha/\alpha^* = 1$. It can be readily shown that the control is settled in $\alpha/\alpha^* = 1$ when the desired value $\alpha^*$ of the controlled variable is changed to another value.

In the control system according to the present invention, when the controlled system is of a kind wherein the controlled variable is expressed in a product or division between the manipulated variable and the disturbance, a quick response can be obtained over the entire range of variation of the disturbance in such a manner that the stability of control is not impaired without requiring any special provision of a compensating device for a variation of the gain, and so-called one pulse control in the control system can be thereby realized. Furthermore, the control system according to the invention has an advantageous feature that the circuit components required can be made up of analog elements of comparatively low cost, and the precision thereof is satisfactory for most practical applications.

It will be apparent that the embodiments shown are only exemplary and that various modifications can be made in construction and arrangement within the scope of the invention as defined in the appended claims.

What is claimed is:

1. A sampling control method comprising the steps of providing a signal corresponding to a quotient between the actual value of a controlled variable at a certain instant and a desired value of the controlled variable, multiplying said signal by a manipulated variable signal obtained in the previous sampling period, and sending the product signal thus obtained to a controlled system as a new manipulated variable signal in the succeeding sampling period, whereby the actual value of the controlled variable in the controlled system is automatically equalized to the desired value of the controlled variable.

2. A sampling control method as recited in claim 1 wherein the actual value of the controlled variable is expressed by the product of the manipulated variable and the system disturbance further comprising the steps of simultaneously sampling and holding the manipulated variable signal and the quotient signal and thereafter sampling and holding the product signal.

3. A sampling control method as recited in claim 1 wherein the actual value of the controlled variable is expressed by the quotient of the manipulated variable and the system disturbance further comprising the steps of simultaneously sampling and holding the manipulated variable signal and the quotient signal and thereafter sampling and holding the product signal.

4. A sampling control device comprising divider means connected to receive as inputs the actual value signal of the controlled variable and a command signal and for providing a quotient output signal, first sample and hold means connected to said divider means for periodically sample-holding the output of the divider, second sample and hold means for storing the manipulated variable obtained in the preceding sampling period, multipler means connected to said first and second sample and hold means for multiplying the outputs of both of said sample and hold means, third sample and hold means connected to said multiplier means for periodically sample-holding the output of said multiplier means and sending it out to the controlled system as a manipulated variable signal in the new sampling period, and mode control means producing signals for mode-controlling said three sample and hold means at predetermined time intervals corresponding to the sampling period.

5. A sampling control device as recited in claim 4 wherein said mode control means controls said first and second sample and hold means to simultaneously sample and hold the outputs of said divider means and said third sample and hold means, respectively, and thereafter controls said third sample and hold means to sample and hold the output of said multiplier means.

6. A sampling control device as recited in claim 4 wherein said divider means and said multiplier means are an analog divider and an analog multiplier, respectively.

7. A sampling control device as recited in claim 6 wherein said first, second and third sample and hold means are reset analog integrators.

8. A sampling control device as recited in claim 7 wherein the controlled system is a digital system further comprising an analog to digital converter connected to the output of said third sample and hold means for converting the analog manipulated variable signal to a digital signal to be supplied to said controlled system, and a digital to analog converter connected to the output of said analog to digital converter for converting said digital signal to an analog signal to be supplied to said second sample and hold means.

* * * * *